H. G. FARR.
TRANSMISSION GEARING.
APPLICATION FILED JUNE 19, 1912.

1,087,873.

Patented Feb. 17, 1914.
2 SHEETS—SHEET 1.

WITNESSES:
H. L. Sprague
R. M. Mowry

INVENTOR,
Herman G. Farr,
BY
Chapin & Co.,
ATTORNEY.

H. G. FARR.
TRANSMISSION GEARING.
APPLICATION FILED JUNE 19, 1912.

1,087,873.

Patented Feb. 17, 1914.
2 SHEETS—SHEET 2.

WITNESSES:
H. L. Sprague
R. M. Mowry

INVENTOR,
Herman G. Farr,
BY Chapin & Co.
ATTORNEY.

UNITED STATES PATENT OFFICE.

HERMAN G. FARR, OF SPRINGFIELD, MASSACHUSETTS, ASSIGNOR TO KNOX AUTOMOBILE COMPANY, OF SPRINGFIELD, MASSACHUSETTS, A CORPORATION OF MASSACHUSETTS.

TRANSMISSION-GEARING.

1,087,873.  Specification of Letters Patent.  Patented Feb. 17, 1914.

Application filed June 19, 1912. Serial No. 704,573.

*To all whom it may concern:*

Be it known that I, HERMAN G. FARR, a citizen of the United States of America, residing at Springfield, in the county of Hampden and State of Massachusetts, have invented new and useful Improvements in Transmission-Gearing, of which the following is a specification.

This invention relates to a transmission driving mechanism and casing constructed in such a way that the transmission gearing proper may be removed from the casing or inserted therein as a unit and remain operative. It is usual to support the transmission gearing in a casing having suitable bearings for the several shafts. If the transmission gearing needs repairing the several parts are removed separately.

The object of this invention is to provide a casing for the transmission parts in which the transmission gearing with all its parts may be removed from the casing as a unit and when removed said transmission gearing will still be mounted in bearings in proper relation so that the gearing can be operated as well after it has been removed from the casing as when it is in the casing.

Other objects of the invention will appear in the detailed description and annexed claims.

With these objects in view the invention comprises a single casing in which the differential gearing and the transmission gearing is mounted. All the shafts of the transmission gearing as the main shaft, counter shaft and reverse stud shaft have suitable bearings in two head members between which members a cage like supporting frame connects. With all the shafts provided with bearings in the two heads of this frame-like structure the casing is so constructed that the frame structure together with its shafts and their gears may be placed in the casing in suitable supporting surfaces. With this construction the two head members and the connecting frame can be removed from the casing or placed therein at will and whether in the casing or out of it the transmission shafts with their gears being supported by the head members can turn in their bearings and the transmission gearing can be operated at will.

With the general structure as outlined one specific form of the invention will be described as illustrative of a preferred form of the invention.

Figure 1:
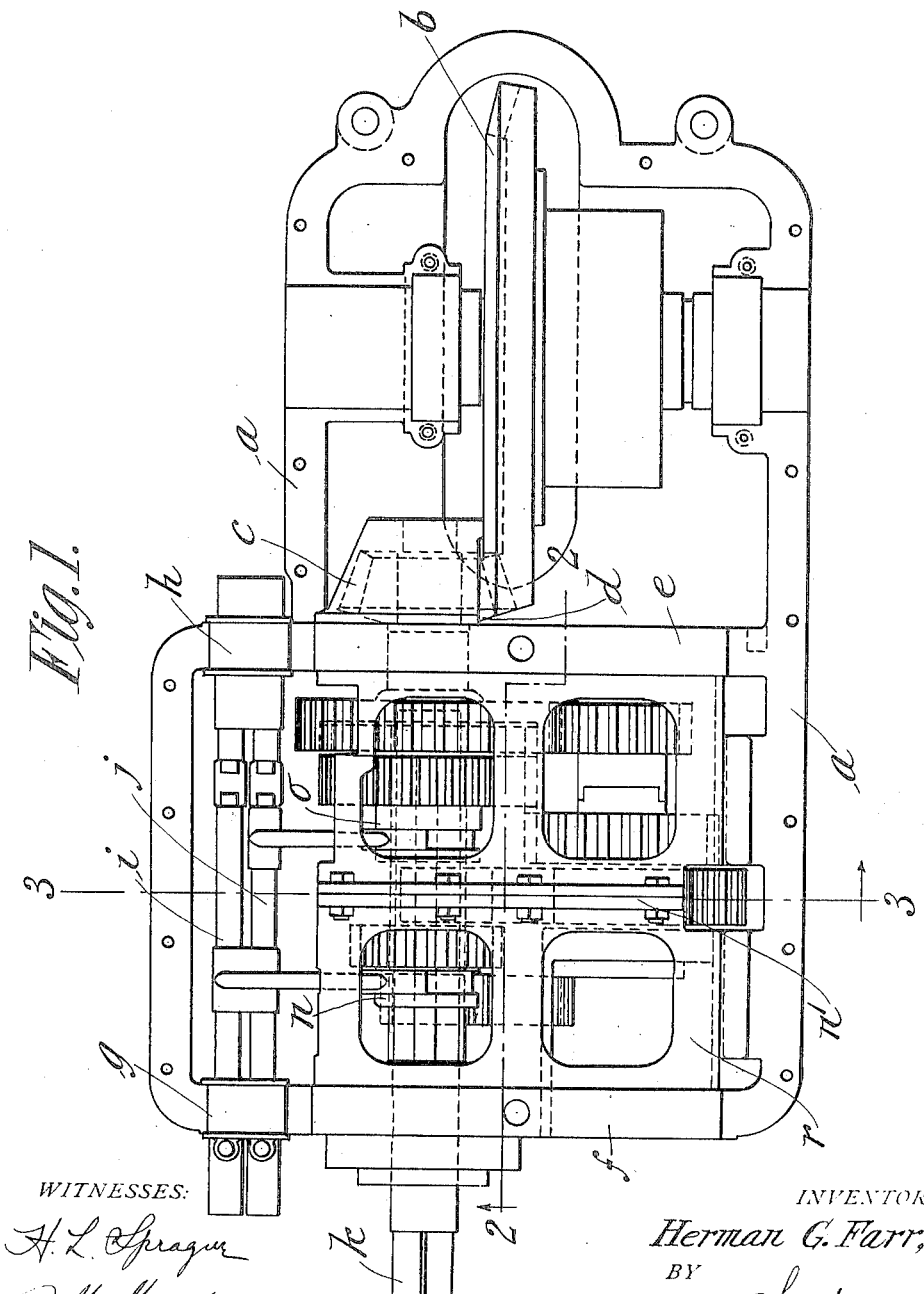
Figure 2:
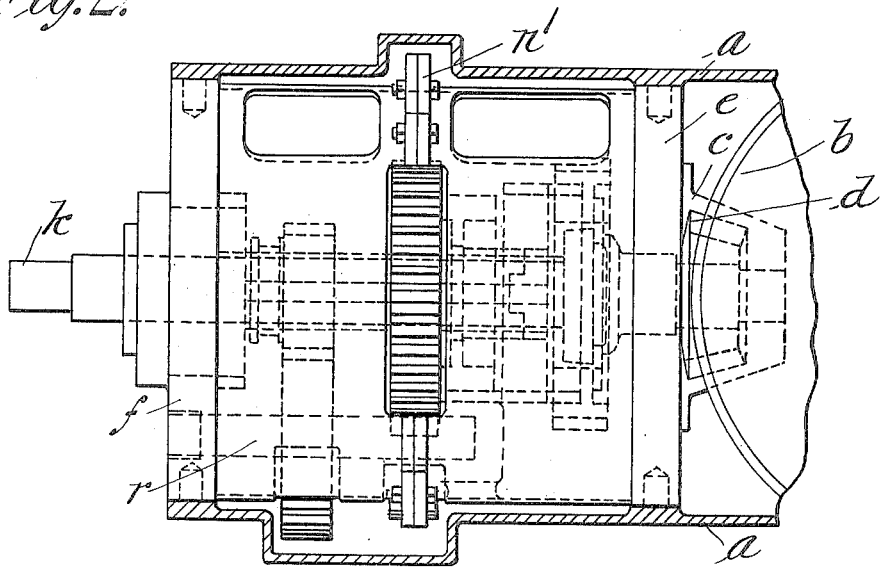
Figure 3:
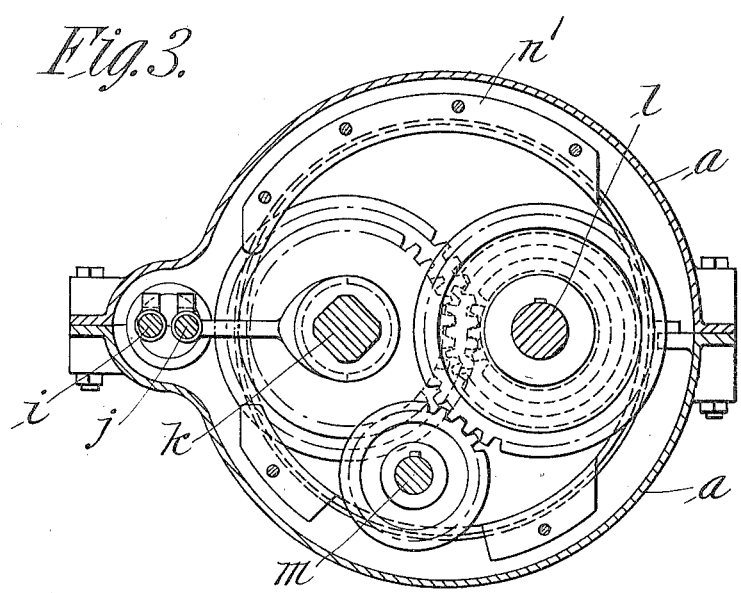

Referring to the drawings in which like reference characters refer to the same parts throughout the several views, Figure 1 is a plan view of the assembled transmission gearing, differential gearing and shifting rods for said transmission gearing, all in place in the lower half of the casing adapted to contain said parts. Fig. 2 is a sectional view on the line 2—2 of Fig. 1. Fig. 3 is a cross sectional view through the casing and the transmission parts as assembled, taken on line 3—3 of Fig. 1.

The upper and the lower half of the casing are designated by $a$ (see Figs. 1 and 3). Suitable supporting bearings are provided in the casing $a$ for the differential gearing $b$ as indicated in Fig. 1. The gear shifting rods $i$ and $j$ are operated through supporting members $h$ and $g$ which are provided with suitable registering surfaces in the casings $a$ and $b$. These shifting rods have right angle extensions, one extending to the clutch $o$ of the transmission gearing and the other to the clutch $n$ thereof.

The transmission gearing proper is supported in suitable bearings in the two head members $e$ and $f$ which, as shown, are circular in form and fit into the casing to be bound therein by suitable fastening devices in a manner obvious from the drawings (see Figs. 1 and 2). Between these head members $e$ and $f$ there is a connecting frame $r$ which, as shown, is provided with openings at various places either to allow certain of the gears to extend therefrom or to lighten the construction. The frame structure is made in two parts which are connected by the flanges $n^1$, bound together by fastening devices. When it is desired to take the transmission mechanism out of the casing as positioned therein in Fig. 1 it is only necessary to remove the top half of the casing $a$, then lift vertically the supporting members $g$ and $h$ to free said members from the casing and then move it horizontally so that the right angled forked extensions will leave the clutch members $o$ and $n$. If the fastening devices for the head members $e$ and $f$ are now loosened these members together with the connecting frame $r$ and the transmission shafts with their gears can be lifted as a unit from the casing *a* and placed where desired. It will be noted that when the transmission gearing is thus lifted from the casing none of the parts thereof are disturbed in their relation to each other so that the transmission mechanism can be operated in the head members independently of the casing.

In the device shown the transmission mechanism comprises a main shaft *k* (see Fig. 3), a counter shaft *l* and a reverse stud shaft *m* of the usual construction with the usual gearing held thereon to give a direct drive in one direction, a low drive and an intermediate drive in one direction as well as a reverse drive. The main shaft *k* is squared and has on one end the beveled gear *d* which drives the differential gear *b*. In order to properly support this beveled gear *d* an extension of the head *e* is provided as at *c* which is cast on said head to form an end bearing for the shaft *k*.

With the construction described it is clear that if it is ever necessary to overhaul the transmission mechanism or adjust the same or repair it in any manner the same can be removed from the casing which ordinarily holds it, taken to a convenient place and operated to find out where it needs adjustment or repairs and after such repairs are made the transmission mechanism can again be operated to test the same and determine its accurate operation before it is re-inserted in its casing. This sort of a structure greatly facilitates both the assembling and the repairing of transmission mechanism ordinarily used in automobiles or gas engines of general use which are usually fixed to some large body as an automobile and as a rule most inconvenient of access.

By means of the construction described the transmission mechanism can be taken to a repair shop all apart from the casing or engine with which it is ordinarily used.

While applicant has described his preferred specific form of invention it is clear that the specific structure could be changed within certain limits without departing from the invention generally.

What I claim, is:—

1. The combination of a transmission casing and a separate frame arranged to be supported thereby, a transmission gear set supported in said frame for operation therein whereby said frame and transmission gear set can be inserted in or taken from said casing while said gear set is in operable condition.

2. The combination of a combined transmission and differential casing, a separate frame arranged to be supported thereby, a transmission gear set operatively mounted in said frame, a differential gear arranged to operate in said casing to be driven by said transmission gear set, all adapted and arranged so that said frame with the transmission gear set can be inserted in or taken from said casing and operated either in or out of said casing.

3. The combination of a transmission casing and a separate frame arranged to be supported thereby comprising two head members arranged to fit in the casing and means connecting said head members together with a transmission gearing, the shafts of which are mounted in bearings in said head members whereby the frame can be inserted or removed from the casing without disturbing the operative condition of the transmission gearing.

4. The combination of a combined transmission and differential casing, a separate frame made in halves comprising each a head member and an extension from one said head member to join the extension from the other to form the frame, transmission gearing, the shafts of which have bearings in said head members to be supported thereby, differential gearing arranged to operate in said casing, all constructed and arranged so that the transmission gearing will drive the differential gearing when both are in the casing and the transmission gearing can be removed from or inserted in the casing with said frame and in operable condition.

5. A casing, differential gearing therein, a frame, transmission gearing operably mounted therein, said casing being arranged to receive said frame whereby the differential gearing will be driven by the transmission gearing, shifting rods to operate the transmission gearing as desired also mounted in said casing, all constructed and arranged that either the gear shifting rods, the said frame, or the differential gearing can be taken from or inserted in said casing separately as units.

HERMAN G. FARR.

Witnesses:
 WM. H. CHAPIN,
 K. I. CLEMONS.